United States Patent [19]
Streit

[11] Patent Number: 5,902,512
[45] Date of Patent: May 11, 1999

[54] ADJUSTABLE DATE STAMP MOLD INSERT

[76] Inventor: Kenneth F. Streit, 414 S. Seegwun Ave., Mt. Prospect, Ill. 60056

[21] Appl. No.: 09/014,728

[22] Filed: Jan. 28, 1998

[51] Int. Cl.[6] .................................................... B29C 33/00
[52] U.S. Cl. ..................... 249/103; 249/155; 425/192 R; 425/195
[58] Field of Search ..................... 249/103, 104, 249/140, 155; 425/190, 192 R, 195, 812; 164/229

[56] References Cited

U.S. PATENT DOCUMENTS

| | | |
|---|---|---|
| 4,137,962 | 2/1979 | Pol . |
| 4,254,933 | 3/1981 | Netto . |
| 4,384,702 | 5/1983 | Boskovic . |
| 4,708,314 | 11/1987 | Kühling . |
| 4,790,738 | 12/1988 | Shimojo et al. . |
| 5,057,000 | 10/1991 | Mangone, Jr. . |
| 5,620,716 | 4/1997 | Opitz . |

FOREIGN PATENT DOCUMENTS

| | | | |
|---|---|---|---|
| 575618 | 4/1993 | Germany | ................................ 249/103 |
| WO89/02831 | 4/1989 | WIPO | ..................................... 249/103 |

OTHER PUBLICATIONS

D–M–E Standard Mold Dating Inserts; (Catalog, K–28), undated.

*Primary Examiner*—James P. Mackey
*Attorney, Agent, or Firm*—Pauley Petersen Kinne & Fejer

[57] ABSTRACT

A mold insert for transferring selectable reference indicia to a molded part is used for tracking various production parameters for a manufactured component. The mold insert contains a plurality of tapered concentric rings, each tapered concentric rings having a face surface containing various transferable reference indicia. A housing having a bore accommodates the plurality of tapered concentric rings and permits rotatable adjustment of the tapered concentric rings relative to a reference indicator. A releasable fastener connected with respect to a tapered core within the tapered concentric rings is used for adjusting and fixing a position of each one of the plurality of tapered concentric rings with respect to one another and the reference indicator.

26 Claims, 6 Drawing Sheets

ADJUSTABLE DATE STAMP MOLD INSERT

BACKGROUND OF THE INVENTION

1. Field of the Invention

This invention relates to a mold insert for impressing reference indicia into a molded component.

2. Description of the Prior Art

Mold inserts are used in plastic molding processes, as well as other part casting operations, to impress one or more reference indicators into a part. Such indicators as date, time, year, shift, batch number or other indicia are helpful for quality control and other situations that require tracking a manufactured component.

Mold inserts are positioned within a mold such that a portion of the mold insert faces an interior surface of the mold. In this manner, the reference information on the mold insert is directly transferable to the molded component.

One prior art style of mold inserts, such as those commercially available through component distributors, National Tool & Mfg. or D-M-E, for plastic molds, comprises a cylindrical housing having a central insert. An arrow indicator is positioned on a surface of the central insert which is adjustable using a screwdriver. Typically, only one or, at most, two items of information may be indicated on such a mold insert. The relative position of the central insert and the housing is maintained with a threaded central insert in combination with a spring loaded ball bearing.

Boskovic, U.S. Pat. No. 4,384,702, teaches a series of adjacent mold engaging inserts. Each insert is ringed with a separate set of indicia for impressing selected indicia on to the manufactured component. A transverse slot is positioned in a center of each insert. The transverse slot is adjustable with a bladed tool, such as a screwdriver, to direct an indicator toward the proper number within the insert. The indicator maintains its position within the insert with the use of a spring biased retention ring. The Boskovic patent teaches a set of four inserts when four separate series of indicia are required.

Opitz, U.S. Pat. No. 5,620,716, also teaches a spring-tensioned mold insert that maintains position of an arrowhead relative to the time indicia on a circular end face of the mold insert. The Opitz patent only teaches a single ring for a single series of indicia.

Netto, U.S. Pat. No. 4,254,933, teaches a mold insert that permits designation of several series of indicia on an imprinted part. The Netto patent teaches a series of concentric rings rotatable around a reference axis perpendicular to the mold surface. The concentric rings are rotatable in increments, each increment designating a different number or letter from the number or letter in the previous increment. In such manner, the Netto patent teaches a mold insert that maintains and imprints a running count of cycles as successive parts are produced. The rings are incrementally rotated using a system of gears and ratchet teeth.

One common problem with prior art mold inserts are the tendency of the closely toleranced moveable components, such as the indicia rings, to become jammed with the plastic residue or other material used in the molding process. When these moveable components become jammed, any adjustment of the indicia on the mold insert becomes difficult, thus requiring equipment stoppages while the mold insert is removed and cleaned. Often this maintenance is ignored thereby compromising the intended purpose of the insert.

SUMMARY OF THE INVENTION

It is one object of this invention to provide a mold insert capable of stamping numerous categories of reference indicia while consuming less surface area relative to prior art mold inserts.

It is another object of this invention to provide a mold insert with taper fit components that avoids jamming of exposed moveable components by plastic residue or other molding process materials that are exposed to the interior of the mold.

It is another object of this invention to provide a mold insert that permits quick adjustment of reference indicia.

It is a further object of this invention to provide a mold insert that stamps the preferred reference indicia for an extended length of time and for a high number of production cycles.

A mold insert according to this invention is used for molded or cast components that require specific, imprinted reference indicia. The mold insert is positioned with respect to a mold so that a face surface of the mold insert is substantially flush with an internal surface of the mold.

The mold insert preferably comprises a plurality of tapered concentric rings. Each successive tapered concentric ring is nested within an outer adjacent tapered concentric ring. In an extended, untensioned position, each respective tapered concentric ring is independently rotatable from each other tapered concentric ring.

Preferably, an outer tapered concentric ring is nested within a housing having a corresponding tapered bore. A center core is preferably positioned within a center of the plurality of tapered concentric rings so that it engages within an inner tapered concentric ring. This center core preferably has an attached screw component which provides the lifting movement to the adjacent tapered concentric rings.

Each tapered concentric ring preferably contains a retainer ring which, in turn, provides lifting movement to the next adjacent tapered concentric ring. This action continues until all tapered concentric rings are released, one from the other, and from the housing, and are then free to be adjusted to a desired setting.

A generally planar face surface is positioned on an exposed circumference of each tapered concentric ring and contains a set of transferable indicia. Therefore, when the face surface is contacted with a molded component, the reference indicia transfers to that molded component. Reference indicia may include such information as year, month, day, date, shift, and any other numbers or letters that may be helpful to track production of a molded or cast component.

A releasable fastener is connected with respect to a central area, such as the center core, of the plurality of tapered concentric rings. In a fastened position, the releasable fastener fixes an angular, or rotatable, position of each one of the plurality of tapered concentric rings with respect to one another. Preferably, threaded engagement between the center core and the releasable fastener permits loosening and adjustment of one or more of the tapered concentric rings.

When released, the face surface of each tapered concentric ring is adjustable relative to a reference indicator that aligns with the respective reference indicia on the face surfaces of each tapered concentric ring. Therefore, the desired reference indicia may be selected and adjusted depending upon the specific manufacturing application.

BRIEF DESCRIPTION OF THE DRAWINGS

The above-mentioned and other features and objects of this invention will be better understood from the following detailed description taken in conjunction with the drawings wherein.

DESCRIPTION OF THE PREFERRED EMBODIMENTS

Figure 1:
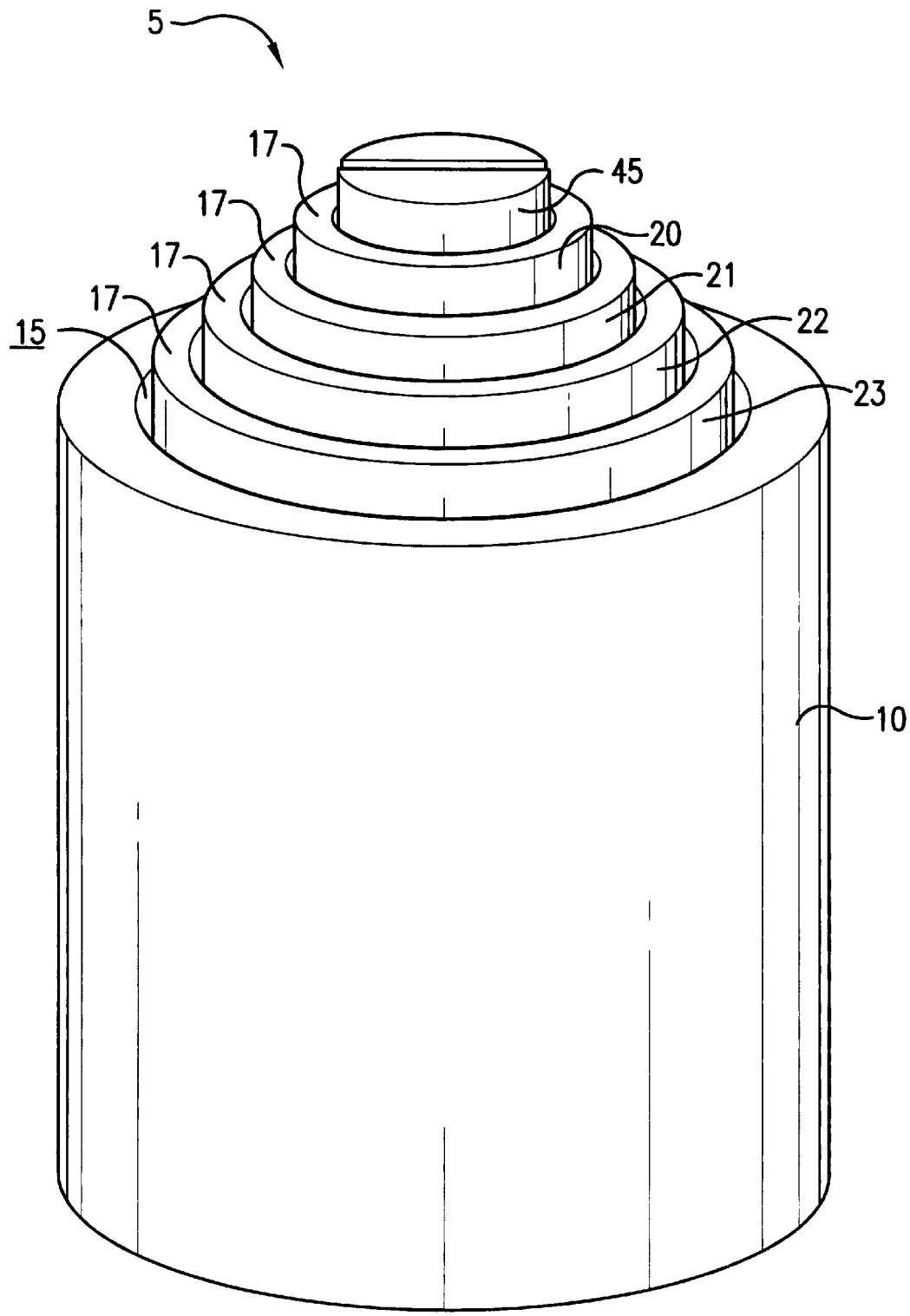
FIG. 1 is a perspective view of a mold insert according to one preferred embodiment of this invention.

A mold insert according to one preferred embodiment of this invention is shown in FIG. 1. Mold insert 5 according to one preferred embodiment is a cylindrical element that is engaged with a mold, such as a plastic injection mold. Although this specification describes a specific application of mold insert 5 to plastic molding, mold insert 5 according to this invention has applications outside of plastics, including virtually any type of molded or cast component that requires specific, imprinted reference indicia.

According to one preferred embodiment of this invention, mold insert 5 is press fit into a pocket in the mold such that face surface 17 of mold insert 5 is substantially flush with an internal surface of the mold. Preferably, face surface 17 contacts a surface of the molded component during the molding process. According to another preferred embodiment of this invention, mold insert 5 is slip fit into the pocket of the mold and retained with a protruding heel member (not shown) on mold insert 5. Other means of attachment known to those having ordinary skill in the art may be utilized to engage mold insert 5 with the mold.

Mold insert 5 is preferably constructed from stainless steel or similar material appropriate for use with industrial tooling. Mold insert 5 is preferably heat-resistant, wear-resistant and corrosion-resistant for use in tooling applications requiring many thousands of repetitive molding cycles.

Figure 2:
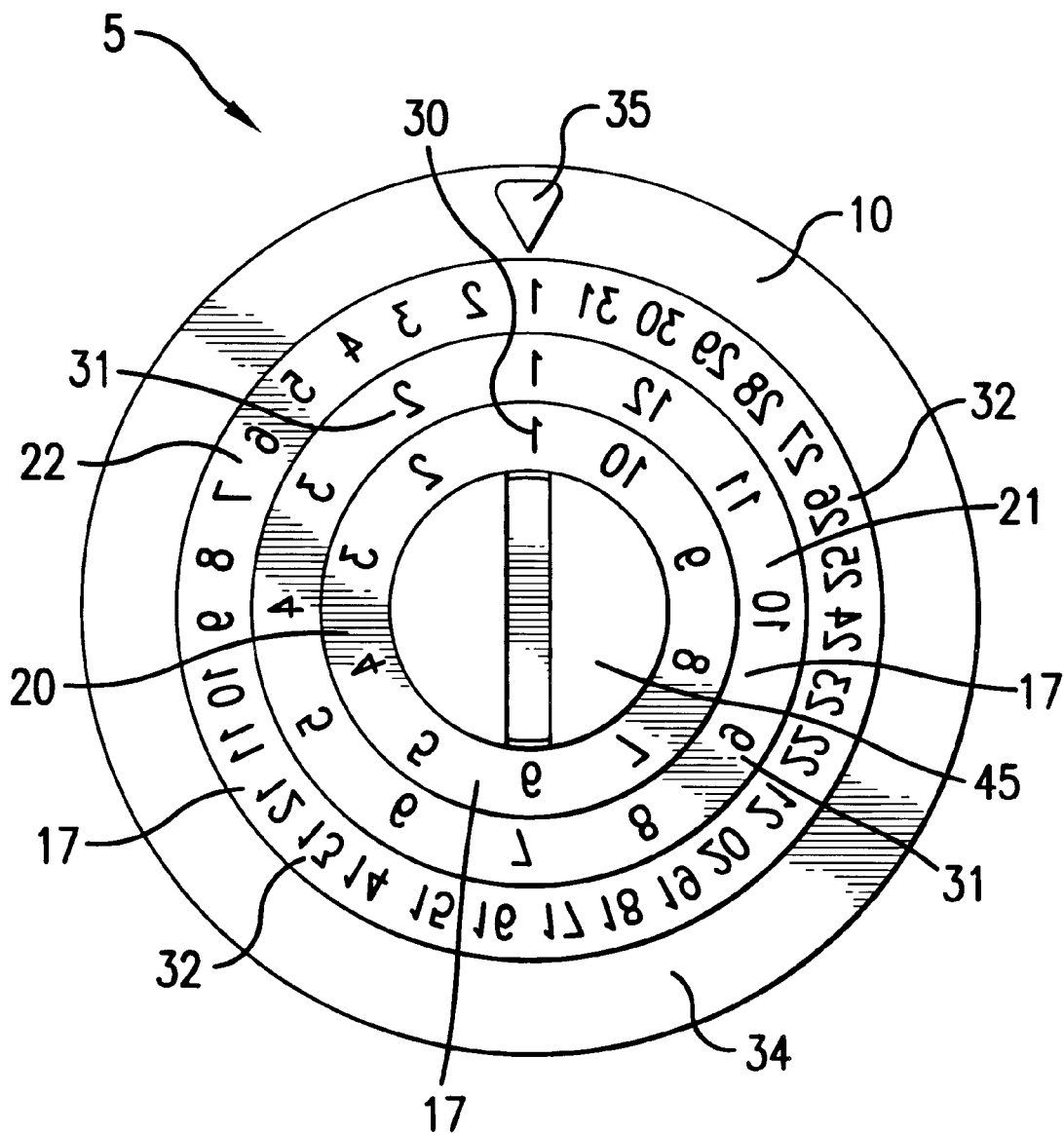
FIG. 2 is a top view of a mold insert according to another preferred embodiment of this invention.
Figure 3:
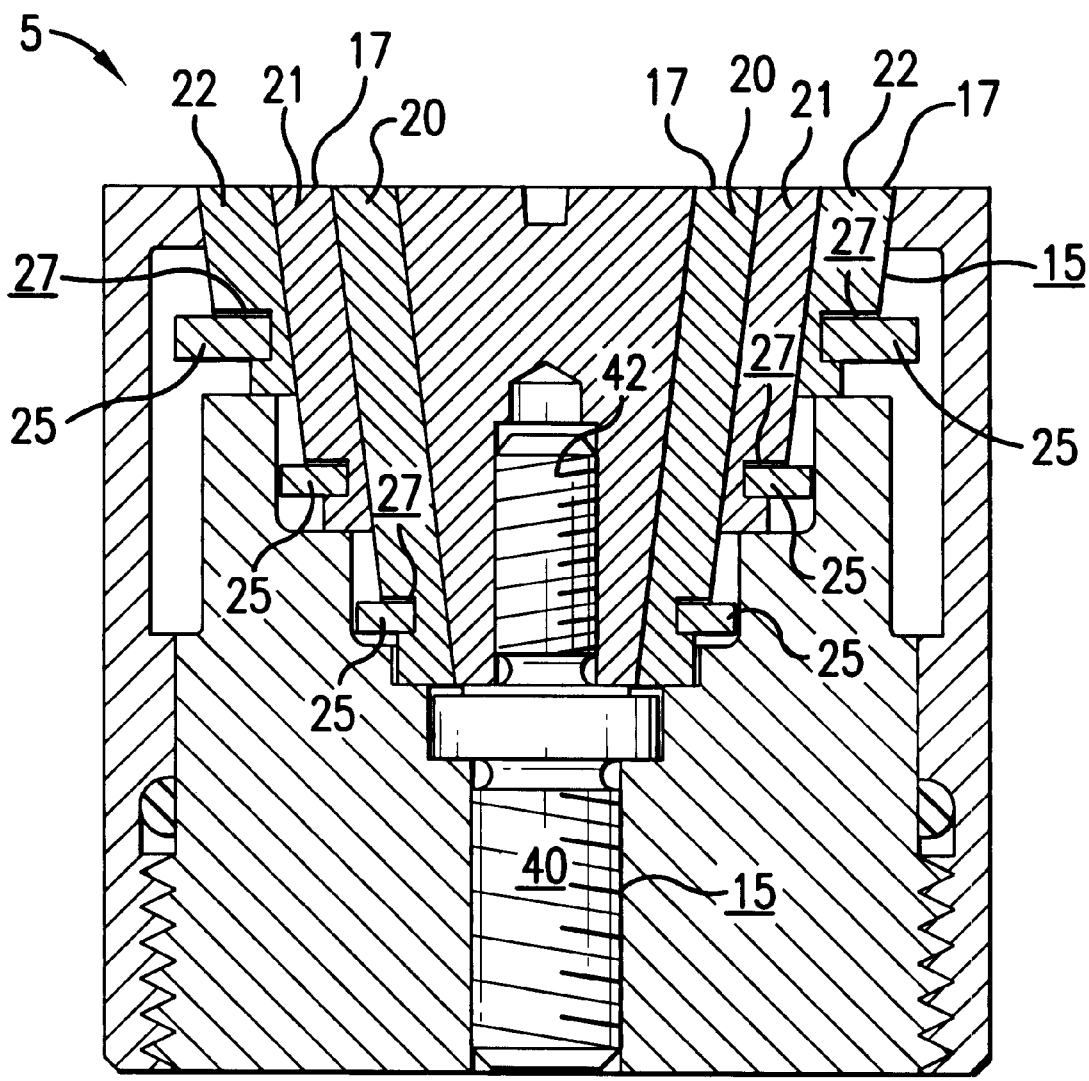
FIG. 3 is a side view of the mold insert shown in FIG. 2.

As shown variously in FIGS. 1–6, mold insert 5 comprises a plurality of tapered concentric rings 20, 21, 22, 23. As shown in FIGS. 1–3, tapered concentric rings comprise first tapered concentric ring 20, second tapered concentric ring 21, and third tapered concentric ring 22. In one preferred embodiment of this invention shown in FIGS. 4–6, fourth tapered concentric ring 23 comprises an outer concentric ring in the plurality of tapered concentric rings 20, 21, 22, 23. Although not shown in the drawings, mold insert 5 may include between two tapered concentric rings and five or more tapered concentric rings.

As shown in FIGS. 1–6, each successive tapered concentric ring 20, 21, 22 is nested within an outer adjacent tapered concentric ring 21, 22, 23. In a released, untensioned position, each respective tapered concentric ring 20, 21, 22, 23 is independently rotatable from each other tapered concentric ring 20, 21, 22, 23. Each tapered concentric ring 20, 21, 22, 23 is preferably positioned, or nested, in extremely close surface contact with each adjacent tapered concentric ring 20, 21, 22, 23. This tight nesting arrangement restricts entry of resin plasticizers or other contaminants from the molded product into mold insert 5 thereby avoiding jamming or seizure of the moveable components of mold insert 5.

According to one preferred embodiment of this invention, shown in FIGS. 1–6, an outer tapered concentric ring 22, 23 is nested, preferably in close surface contact, within housing 10. In this preferred embodiment of the invention, each tapered concentric ring 20, 21, 22, 23 is positioned within housing 10. Housing 10 is preferably, though not necessarily, a cylindrical unit having a housing bore 15. Housing bore 15 is preferably tapered or otherwise stepped so that an outer tapered concentric ring, such as third tapered concentric ring 22, shown in FIG. 2, or fourth tapered concentric ring 23, shown in FIG. 4, engages with housing bore 15 in a manner similar to the engagement of adjacent tapered concentric rings 20, 21, 22, 23. Housing 10 may contain threaded bores or other attachment means for affixing mold insert 5 to mold.

Figure 5:
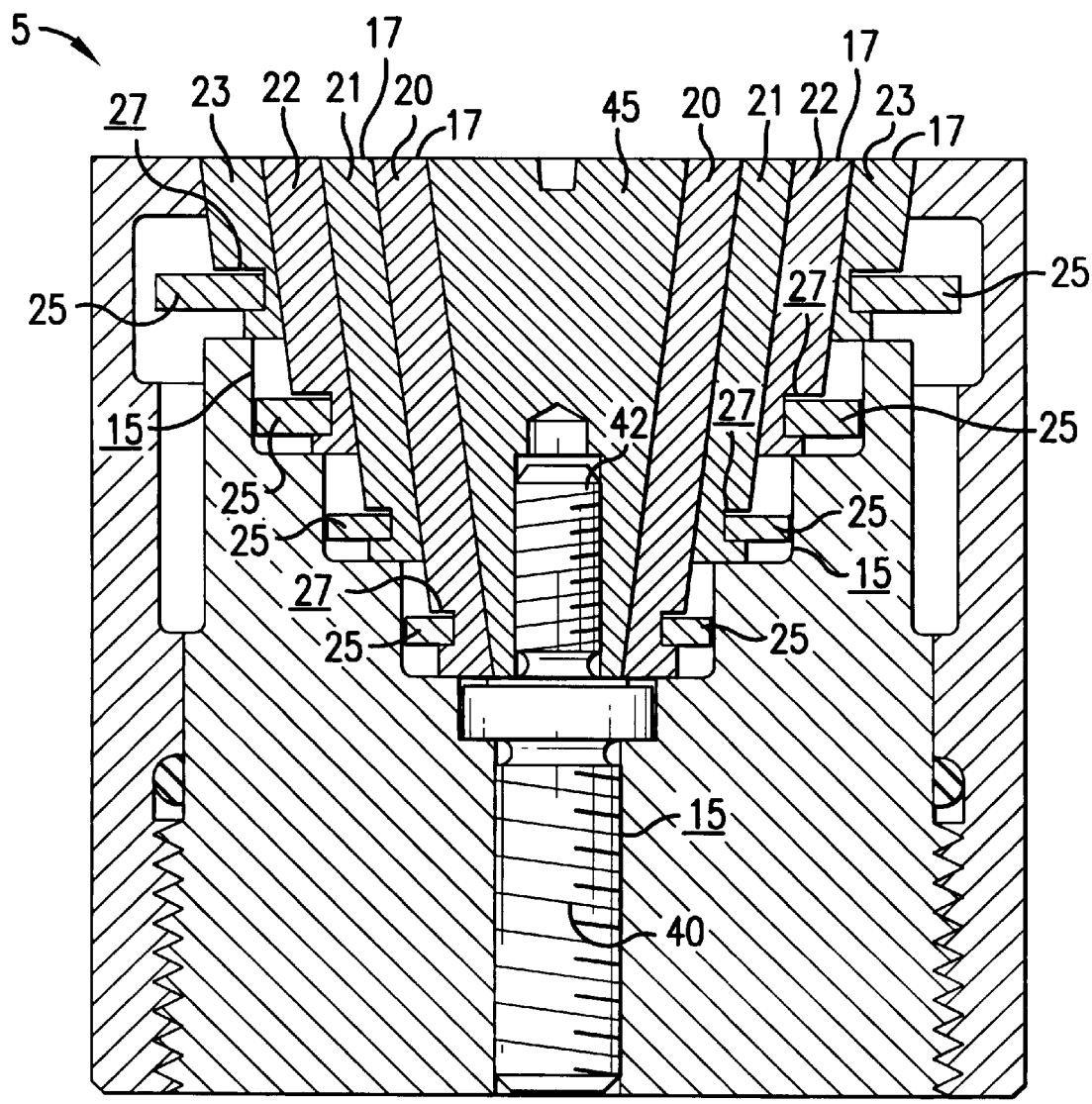
FIG. 5 is a side view of the mold insert shown in FIG. 4.
Figure 6:
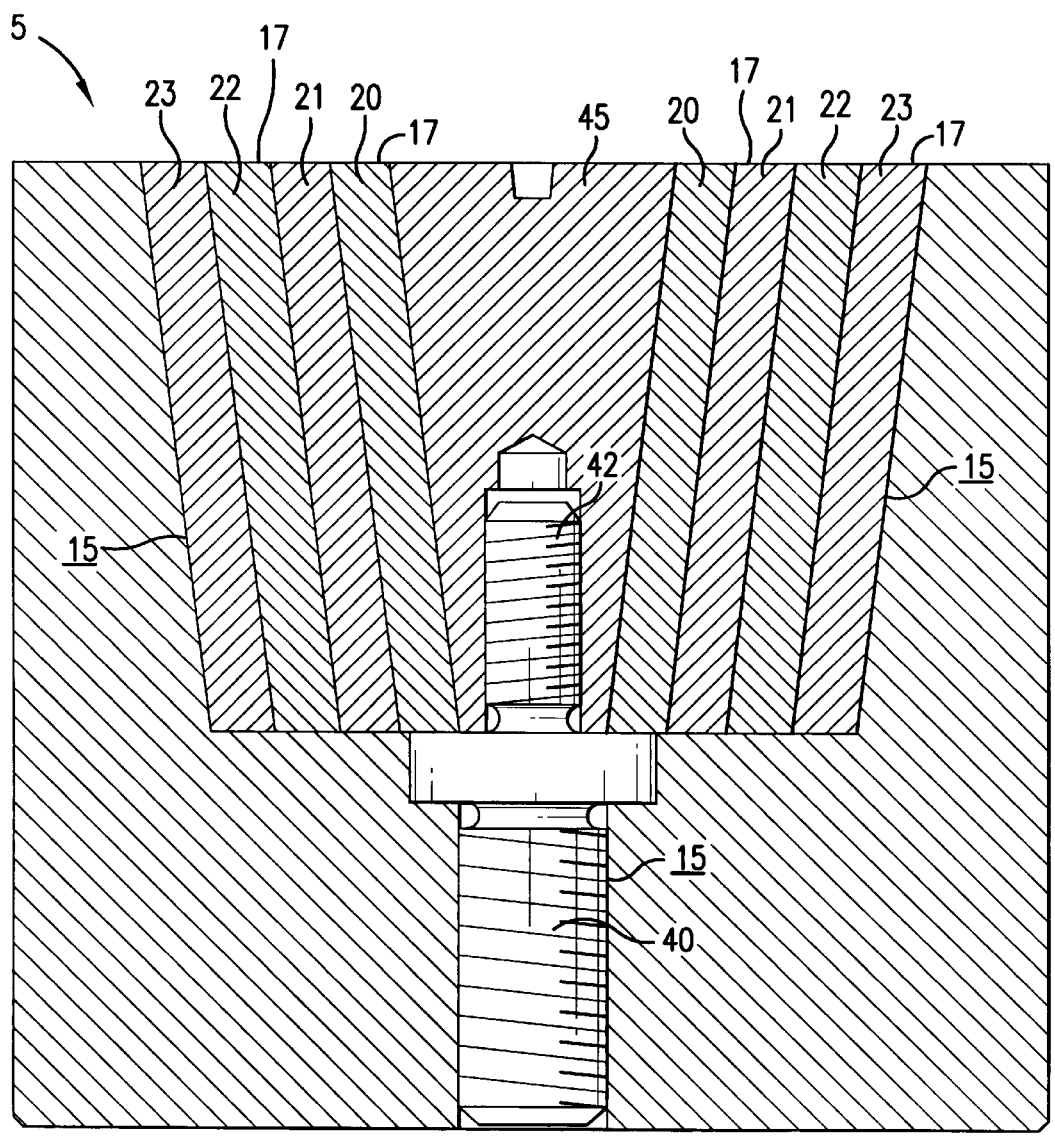
FIG. 6 is a side view of a mold insert according to another preferred embodiment of this invention.

As shown in FIGS. 3, 5 and 6, tapered concentric rings 20, 21, 22, 23 do not extend through housing bore 15 for a full length of housing 10. However, in another preferred embodiment of this invention, tapered concentric rings 20, 21, 22, 23 may extend through the full length of housing 10.

In a preferred embodiment of this invention shown in FIGS. 3, 5 and 6, center core 40 is positioned within a center of the plurality of tapered concentric rings 20, 21, 22, 23. Center core 40 is preferably tapered or stepped so that center core 40 engages within first tapered concentric ring 20.

Preferably, face surface 17 is positioned on an exposed circumference of each tapered concentric ring 20, 21, 22, 23. Face surface 17 is preferably generally planar and, in one preferred embodiment of this invention, contains a set of transferable indicia 30, 31, 32, 33. When the plurality of tapered concentric rings 20, 21, 22, 23 are in a fully-seated position, face surface 17 of the plurality of tapered concentric rings 20, 21, 22, 23 is preferably generally planar and flush with respect to each face surface 17.

Indicia 30, 31, 32, 33 preferably comprises raised letters, numerals or other indicia. Alternatively, indicia 30, 31, 32, 33 may comprise engraved letters, numerals or other indicia. Regardless of the physical characteristics of indicia 30, 31, 32, 33, when face surface 17 is contacted with a molded component, indicia 30, 31, 32, 33 is transferable to that molded component. Therefore, when indicia 30, 31, 32, 33 is in a raised configuration, the molded part is imprinted with sunken indicia and when indicia 30, 31, 32, 33 is in an engraved configuration, the molded part is imprinted with raised indicia.

According to one preferred embodiment of this invention, shown in FIG. 2, year indicia 30 is positioned on face surface 17 of first tapered concentric ring 20. Also as shown in FIG. 2, month indicia 31 is positioned on face surface 17 of second tapered concentric ring 21 and day indicia 32 is positioned on face surface 17 of third tapered concentric ring 22. According to another preferred embodiment of this invention, shown in FIG. 4, shift indicia 33 is positioned on face surface 17 of first tapered concentric ring 20.

Of course, the relative positions and contents of indicia 30, 31, 32, 33 on tapered concentric rings 20, 21, 22, 23 may be adjusted based upon the suitability of the particular application. Other indicia such as serial numbers, mold cavity numbers, or production machine numbers may also be positioned on face surface 17 of one or more of tapered concentric rings 20, 21, 22, 23.

In one preferred embodiment of this invention, releasable fastener 45 is connected with respect to a central area of the plurality of tapered concentric rings 20, 21, 22, 23. In a fastened position, releasable fastener 45 fixes an angular position of each one of the plurality of tapered concentric rings 20, 21, 22, 23 with respect to one another. In a released position, releasable fastener 45 permits adjustment of the angular, rotatable position of one or more of the plurality of tapered concentric rings 20, 21, 22, 23 with respect to one another.

Preferably, releasable fastener 45 is adjustable with a bladed tool, such as a screwdriver. Alternatively, releasable fastener 45 may be adjustable with a hex wrench such as an Allen wrench, or any other adjustment means known to those have ordinary skill in the art.

In another preferred embodiment of this invention, releasable fastener 45 is connected with respect to center core 40. Center core 40 preferably contains threaded portion 42, with an internally threaded bore and an external threaded screw portion, as shown in FIGS. 3, 5 and 6. Releasable fastener 45 preferably contains corresponding threads so that releasable fastener 45 is threadably engaged with threaded portion 42 of center core 40. In this preferred embodiment of the invention, when releasable fastener 45 is fully tightened with respect to center core 40, each tapered concentric ring 20, 21, 22, 23 is forced into engagement with each adjacent tapered concentric ring 20, 21, 22, 23 and, preferably, housing 10. The corresponding tapers of the components of mold insert 5 thereby lock each tapered concentric ring 20, 21, 22, 23 into a fixed angular position with respect to each other tapered concentric ring 20, 21, 22, 23. Although, as shown in FIG. 6, tapered concentric rings 20, 21, 22, 23 preferably have a generally smooth taper, in an alternative embodiment, tapered concentric rings 20, 21, 22, 23 may have a stepped taper comprising a series of discrete reductions in diameter.

In another preferred embodiment of this invention, shown in FIGS. 3 and 5, retainer rings 25 are disposed within grooves 27 provided in an outer edge of each tapered concentric ring 20, 21, 22, 23. Retainer rings 25 may be constructed from a flexible metallic material, such as spring steel, or other material possessing the desired properties of flexibility, heat-resistance and wear-resistance. Retainer rings 25 positioned in grooves 27 provide the relative lifting action necessary to allow free adjustment of tapered concentric rings 20, 21, 22, 23 into a desired setting while in a released position.

In one preferred embodiment of this invention, reference indicator 35 is positioned on housing 10. Reference indicator 35, such as an embossed or recessed arrow, as shown in FIG. 2, is preferably a fixed reference point that aligns with the reference indicia on face surface 17 of each tapered concentric ring 20, 21, 22. Accordingly, FIG. 2 shows that day indicia 32 of third tapered concentric ring 22 is set to day "1" and month indicia 31 of second tapered concentric ring 21 is set to month "1". Year indicia 30 of first tapered concentric ring 20 is set to production year "1".

Figure 4:
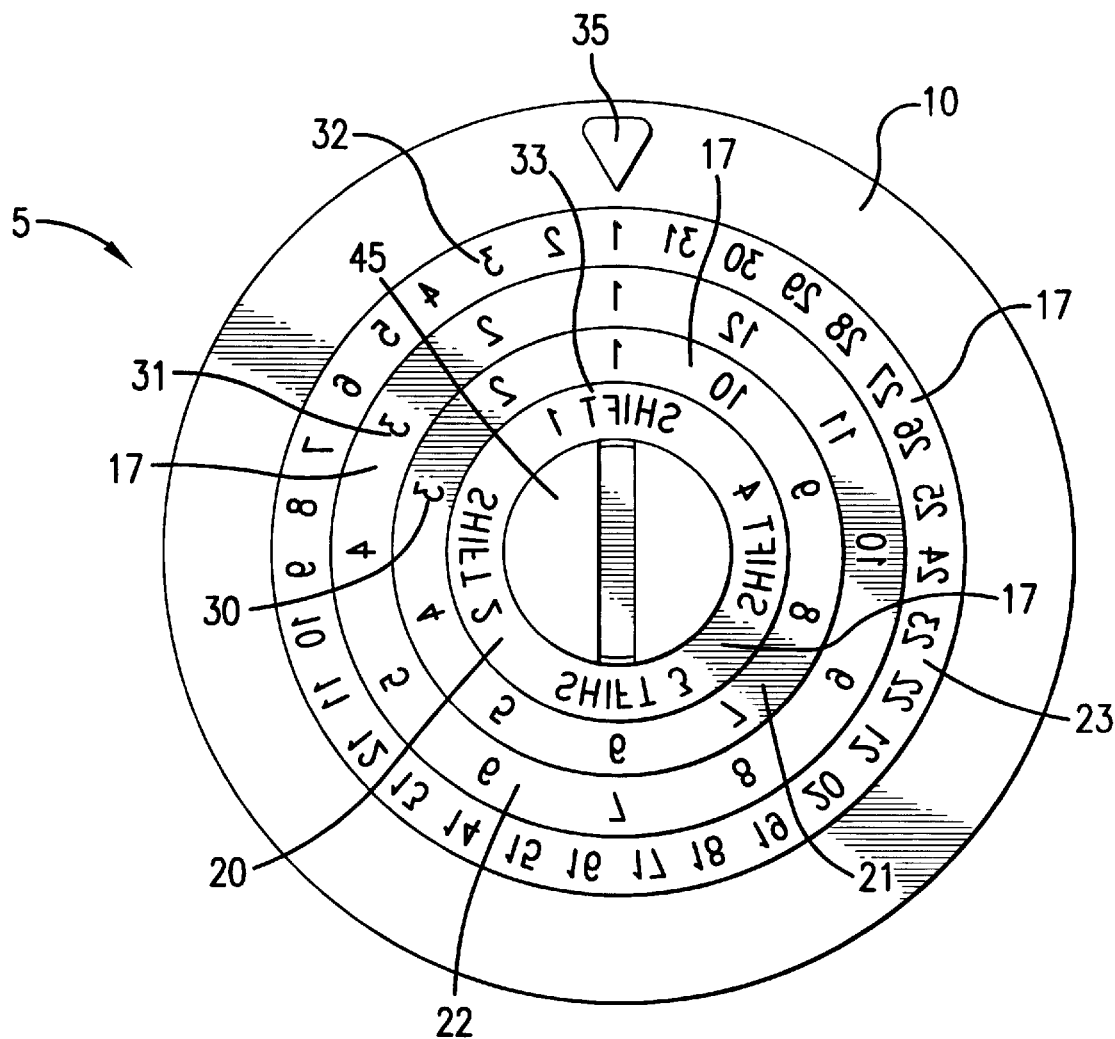
FIG. 4 is a top view of a mold insert according to another preferred embodiment of this invention.

In another preferred embodiment of this invention, shown in FIG. 4, reference indicator 35 is also a fixed reference point positioned on housing 10. In this preferred embodiment, reference indicator 35 is also aligned with reference indicia on face surface 17 of each tapered concentric ring 20, 21, 22, 23. Specifically, FIG. 4 shows that day indicia 32 of fourth tapered concentric ring 23 is set to day "1"; month indicia 31 of third tapered concentric ring 22 is set to month "1"; year indicia 30 of second tapered concentric ring 21 is set to year "1"; and shift indicia 33 of first tapered concentric ring 20 is set to "SHIFT 1".

As shown in FIGS. 3, 5 and 6, tapered concentric rings 20, 21, 22, 23 have a taper that opens up toward face surface 17. The preferred angle of the taper depends upon the configuration of the mold and the preferred method for releasing engagement of tapered concentric rings 20, 21, 22, 23.

While in the foregoing specification this invention has been described in relation to certain preferred embodiments thereof, and many details have been set forth for purposes of illustration, it will be apparent to those skilled in the art that the apparatus is susceptible to additional embodiments and that certain of the details described herein can be varied considerably without departing from the basic principles of the invention.

I claim:

1. A mold insert for transferring reference indicia on a molded part, the mold insert comprising:

a plurality of tapered concentric rings, each having a face surface and a taper opening up toward the face surface, the face surface of at least one of the plurality of tapered concentric rings having a set of transferable indicia; and a releasable fastener connected with respect to a center core of the plurality of tapered concentric rings, the releasable fastener for adjusting and fixing an angular position of each one of the plurality of tapered concentric rings with respect to one another.

2. The mold insert of claim 1 wherein the plurality of tapered concentric rings are positioned within a housing.

3. The mold insert of claim 1 further comprising a tapered center core positioned within a center of the plurality of tapered concentric rings.

4. The mold insert of claim 3 wherein the tapered center core has a threaded portion, the releasable fastener engageable with the threaded portion.

5. The mold insert of claim 1 wherein a taper in at least one of the plurality of tapered concentric rings is formed by a generally smooth taper.

6. The mold insert of claim 1 wherein a taper in at least one of the plurality of tapered concentric rings is formed by a series of discrete diameter reductions.

7. The mold insert of claim 2 wherein a reference indicator is positioned on the housing.

8. The mold insert of claim 3 wherein a reference indicator is positioned on the tapered center core.

9. The mold insert of claim 1 wherein, when the plurality of tapered concentric rings are in a fully-seated position, a circular face surface of the plurality of tapered concentric rings is generally planar.

10. The mold insert of claim 1 further comprising a retainer ring positioned between each one of the plurality of tapered concentric rings, the retainer ring providing relative lifting motion of each tapered concentric ring with respect to each adjacent tapered concentric ring.

11. A mold insert for marking reference indicia on a molded part, the mold insert comprising:

a housing having a tapered circular bore;

a plurality of tapered concentric rings positioned within the tapered circular bore, each having a face surface and a taper opening up toward the face surface the face surface of at least one of the plurality of tapered concentric rings having a set of transferable indicia;

a tapered center core positioned within a center of the plurality of tapered concentric rings; and a releasable fastener connected with respect to the tapered core for adjusting and fixing a position of each one of the plurality of tapered concentric rings with respect to one another.

12. The mold insert of claim 11 wherein the releasable fastener is connected with respect to a threaded portion of the tapered core.

13. The mold insert of claim 11 wherein a reference indicator is positioned on the housing.

14. The mold insert of claim 11 wherein a retainer ring is positioned between each one of the plurality of tapered concentric rings.

15. A mold insert for transferring reference indicia on a molded part, the mold insert comprising:

a plurality of tapered concentric rings, each having a face surface, the face surface of at least one of the plurality of tapered concentric rings having a set of transferable indicia;

a releasable fastener connected with respect to a center core of the plurality of tapered concentric rings, the releasable fastener for adjusting and fixing an angular position of each one of the plurality of tapered concentric rings with respect to one another; and a taper in at least one of the plurality of tapered concentric rings formed by a generally smooth taper.

16. The mold insert of claim 15 wherein the plurality of tapered concentric rings are positioned within a housing.

17. The mold insert of claim 15 further comprising a tapered center core positioned within a center of the plurality of tapered concentric rings.

18. The mold insert of claim 17 wherein the tapered center core has a threaded portion, the releasable fastener engageable with the threaded portion.

19. The mold insert of claim 15 wherein a taper in at least one of the plurality of tapered concentric rings is formed by a series of discrete diameter reductions.

20. The mold insert of claim 16 wherein a reference indicator is positioned on the housing.

21. The mold insert of claim 17 wherein a reference indicator is positioned on the tapered center core.

22. The mold insert of claim 15 wherein, when the plurality of tapered concentric rings are in a fully-seated position, a circular face surface of the plurality of tapered concentric rings is generally planar.

23. A mold insert for marking reference indicia on a molded part, the mold insert comprising:

a housing having a tapered circular bore;

a plurality of tapered concentric rings positioned within the tapered circular bore, a face surface of at least one of the plurality of tapered concentric rings having a set of transferable indicia;

a tapered center core positioned within a center of the plurality of tapered concentric rings;

a releasable fastener connected with respect to the tapered core for adjusting and fixing a position of each one of the plurality of tapered concentric rings with respect to one another; and a taper in at least one of the plurality of tapered concentric rings formed by a generally smooth taper.

24. The mold insert of claim 23 wherein the releasable fastener is connected with respect to a threaded portion of the tapered core.

25. The mold insert of claim 23 wherein a reference indicator is positioned on the housing.

26. The mold insert of claim 23 wherein a retainer ring is positioned between each one of the plurality of tapered concentric rings.

* * * * *